(12) United States Patent
Guesdon

(10) Patent No.: US 6,889,915 B2
(45) Date of Patent: May 10, 2005

(54) SAFETY DEVICE FOR A SPRAY BOOM

(75) Inventor: Alain Guesdon, Noisy sur Ecole (FR)

(73) Assignee: Kuhn-Nodet S.A., Montereau (FR)

( * ) Notice: Subject to any disclaimer, the term of this patent is extended or adjusted under 35 U.S.C. 154(b) by 373 days.

(21) Appl. No.: 10/050,957

(22) Filed: Jan. 22, 2002

(65) Prior Publication Data

US 2002/0109016 A1 Aug. 15, 2002

(30) Foreign Application Priority Data

Feb. 9, 2001 (FR) .............................. 01 02044

(51) Int. Cl.$^7$ ............................... B05B 1/20
(52) U.S. Cl. ......................... 239/166; 239/169
(58) Field of Search ............................ 239/163, 164, 239/166, 167, 168, 169

(56) References Cited

U.S. PATENT DOCUMENTS

| | | | |
|---|---|---|---|
| 2,564,041 A | | 8/1951 | Vogel, Jr. |
| 4,200,255 A | * | 4/1980 | Schmidt et al. .......... 248/291.1 |
| 4,634,051 A | * | 1/1987 | Dudley ....................... 239/168 |
| 5,154,240 A | * | 10/1992 | Carrick ....................... 172/311 |
| 6,315,218 B1 | | 11/2001 | Guesdon |

FOREIGN PATENT DOCUMENTS

| | | |
|---|---|---|
| FR | 2 673 355 | 9/1992 |
| GB | 2 107 162 | 4/1983 |

OTHER PUBLICATIONS

U.S. Appl. No. 09/808,168, pending, filed Mar. 15, 2001.
U.S. Appl. No. 09/899,154, pending, filed Jul. 6, 2001.
U.S. Appl. No. 09/948,578, pending, filed Sep. 10, 2001.
U.S. Appl. No. 10/051,041, pending, filed Jan. 22, 2002.
U.S. Appl. No. 10/050,961, pending, filed Jan. 22, 2002.
U.S. Appl. No. 10/325,838, Guesdon et al., filed Dec. 23, 2002.
U.S. patent application Ser. No. 10/325,938, Guesdon et al., filed Dec. 23, 2002.

* cited by examiner

Primary Examiner—Christopher Kim
(74) Attorney, Agent, or Firm—Oblon, Spivak, McClelland, Maier & Neustadt, P.C.

(57) ABSTRACT

The present invention relates to a spray boom comprising an end section connected to a second section by an articulation, a holding device intended to keep the end section in an initial position as long as a pivoting force has not reached a certain triggering threshold. After triggering, the return of the boom to the initial position is due solely to the weight of the end section. The present invention advantageously makes it possible to reduce the knocks generated by the devices of the prior art.

8 Claims, 3 Drawing Sheets

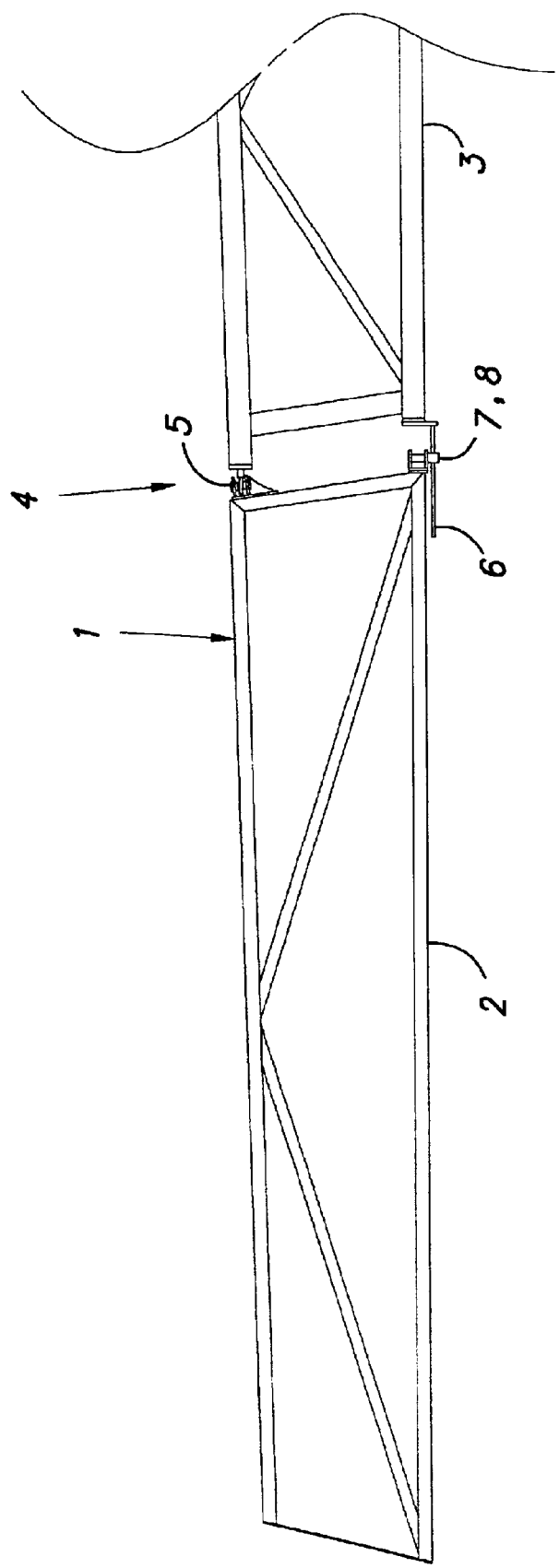

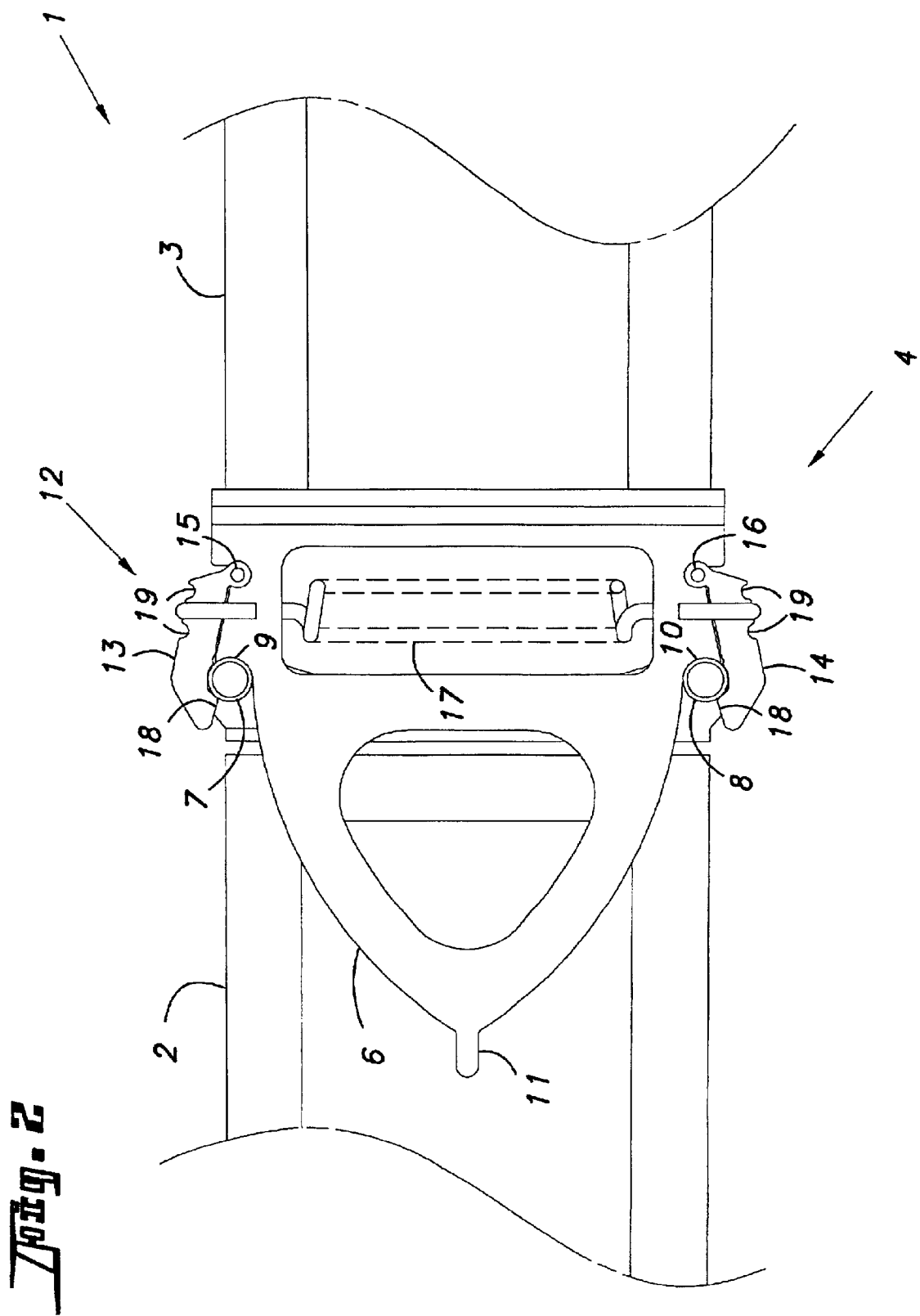

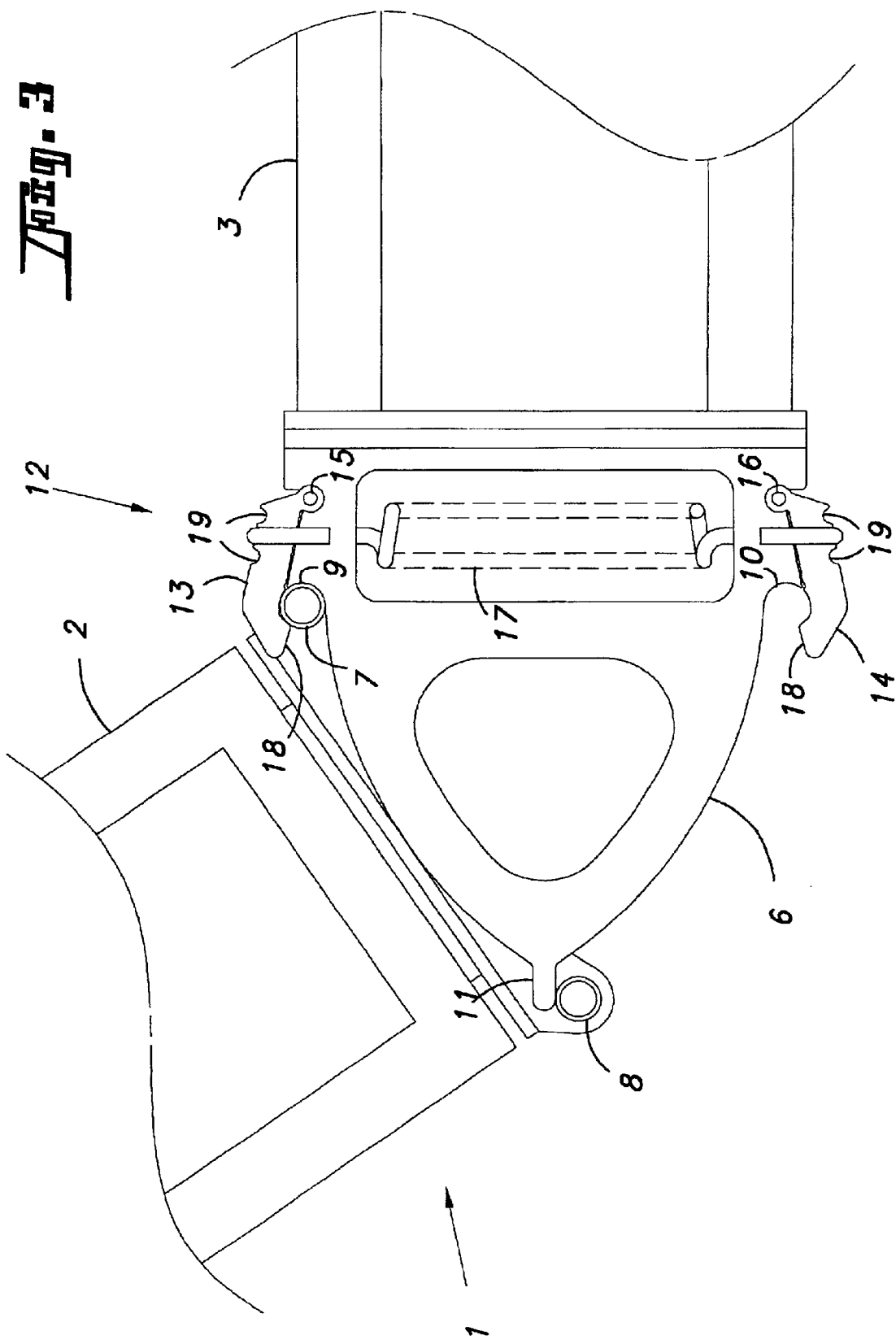

SAFETY DEVICE FOR A SPRAY BOOM

BACKGROUND OF THE INVENTION

1. Field of the Invention

The present invention relates to the general technical field of agricultural machinery and relates more specifically to a boom according to the preamble of claim 1.

2. Discussion of the Background

Document FR 2 673 355 describes a spray boom comprising an end section connected to an intermediate section by an articulation made up of a ball joint, of a guide rail and of pins. Upon contact with an obstacle, such an articulation advantageously allows said end section to move away laterally or upward. Once the obstacle has been passed, said end section is returned to its initial position using a draw-spring.

This known safety device does, however, have one drawback. This is that during work, the boom experiences shakes due, for example, to the bumps in the terrain that is to be treated. In order to keep said end section in its initial position, said draw-spring has therefore to exert a relatively high holding force.

In addition, upon contact with an obstacle, the pivoting of said end section with respect to said intermediate section has the effect of lengthening said draw-spring. The return force thus created adds to the initial holding force. Once the obstacle has been passed, the end section is therefore returned violently to its initial position. The boom therefore experiences knocks which, in the long term, are damaging.

SUMMARY OF THE INVENTION

The object of the present invention consists in overcoming this drawback of the prior art.

To this end, the spray boom of the present invention is one wherein, after triggering, the return of said boom to its initial position is due solely to the weight of said end section.

BRIEF DESCRIPTION OF THE DRAWINGS

Other features of the invention, to be considered separately or in all their possible combinations, will become further apparent from the following description of one nonlimiting exemplary embodiment of the invention which embodiment is depicted in the appended figures, in which:

FIG. 1 partially depicts a boom according to the present invention,

FIG. 2 depicts, viewed on arrow II defined in FIG. 1 and on a different scale, the boom of FIG. 1 in the initial position, FIG. 3 depicts the boom of FIG. 2 in the pivoted position.

DESCRIPTION OF THE PREFERRED EMBODIMENT

The spray boom 1 depicted partially in FIG. 1 comprises an end section 2 connected to a second section 3 by an articulation 4. In a way known to those skilled in the art, said articulation 4 is produced by a ball joint 5, a guide rail 6 and two pins 7, 8.

Said guide rail 6, arranged in a substantially horizontal plane, is connected to a low part of said second section 3. Said pins 7, 8, with at least substantially vertical axes, are connected to a low part of said end section 2. Said pins 7, 8 are advantageously arranged one on each side of a vertical mid-plane of said end section 2. When said boom 1 is not encountering an obstacle, said pins 7, 8 rest against a respective groove 9, 10 provided on said guide rail 6. For its part, said ball joint 5 is connected, on one hand, to a top part of said end section 2 and, on another hand, to a top part of said second section 3. Said ball joint 5 is advantageously arranged in said vertical mid-plane of said end section 2 and in a vertical mid-plane of said second section 3.

When an obstacle is encountered, said end section 2 can move away laterally by pivoting, for example with respect to said second section 3, about an axis passing through said ball joint 5 and through one of said pins 7, 8.

FIG. 3 depicts such a situation. The pin 7, located behind with respect to a direction of forward travel, has remained in contact with said groove 9. For its part, the pin 8, situated in front with respect to said direction of forward travel, has slid along said guide rail 6. In the example depicted in FIG. 3, said end section 2 has therefore pivoted about an axis passing through said ball joint 5 and the pin 7. To avoid excessive pivoting of said end section 2 with respect to said second section 3, said guide rail 6 also comprises a stop 11. FIG. 3 depicts an extreme case in which said pin 8 comes into contact with said stop 11.

In a way known to those skilled in the art, a holding device 12 is also provided and this is intended to keep said end section 2 in its initial position. Said holding device 12 advantageously makes it possible to avoid any inadvertent pivoting of said end section 2 relative to said second section 3. Said inadvertent pivoting may, in particular, be caused by shakes experienced by said boom 1 or by working at a steep slope. It goes without saying that, when an obstacle is encountered, said holding device 12 allows said end section 2 to move away as described hereinabove.

According to an important feature of the present invention, said holding device 12 keeps said end section 2 in said initial position as long as a pivoting force has not reached a certain triggering threshold. Once this threshold has been exceeded, said holding device 12 exerts no return force on said end section 2. The return to the initial position is therefore due solely to the weight of said end section 2.

In the embodiment depicted in the figures, said holding device 12 comprises two jaws 13, 14 arranged in a plane of extension of said guide rail 6. One end of each jaw 13, 14 is connected to said guide rail 6 by a respective articulation 15, 16, the axis of which is substantially vertical. Another end of each jaw 13, 14 is provided with a shape which substantially complements the shape of said pins 7, 8. Said holding device 12 additionally comprises a spring 17 intended to close said jaws 13, 14.

When said end section 2 is in its initial position, as depicted in FIG. 2, said pins 7, 8 are in engagement with said jaws 13, 14.

By contrast, the pivoting force generated by the encountering of an obstacle causes at least one of said pins 7, 8 to be released through the opening of the corresponding jaw 13, 14. This opening of said jaw 13, 14, which is obtained by the pivoting thereof about said respective articulation 15, 16, takes place against the action of said spring 17.

From FIG. 3, it can be seen that when one of said pins 7, 8 has left its initial position, said corresponding jaw 13, 14 is flattened by said spring 17 against said guide rail 6.

To facilitate the return of said pin 7, 8 to its initial position, said jaws 13, 14 are advantageously provided with a respective chamfer 18.

The triggering threshold of said holding device 12 is advantageously adjustable. For this purpose, in the exemplary embodiment depicted in the figures, said jaws 13, 14 are provided with recesses 19. The position of said spring 17 in said recesses 19 determines the force needed to open said jaws 13, 14. Said holding device 12 depicted in the figures advantageously allows six different settings of the triggering threshold.

The boom 1 which has just been described is merely one exemplary embodiment and example of use which must not in any case be considered as limiting the field of protection defined by the claims which follow.

According to an exemplary embodiment not depicted, said jaws 13, 14 are kept closed using a respective spring.

What is claimed as new and desired to be secured by Letters Patent of the United States is:

1. Spray boom comprising:

an end section connected to a second section by an articulation; and a holding device intended to keep said end section in an initial position as long as a pivoting force has not reached a certain triggering threshold, wherein, after triggering, a return of said boom to the initial position is due solely to a weight of said end section, wherein said articulation comprises a ball joint, a guide rail, and two pins, and wherein said holding device comprises at least one jaw and wherein, in the initial position, one of said two pins is engaged in said at least one jaw.

2. Spray boom as claimed in claim 1, wherein said at least one jaw is held closed by a spring.

3. Spray boom comprising:

an end section connected to a second section by an articulation; and a holding device intended to keep said end section in an initial position as long as a pivoting force has not reached a certain triggering threshold, wherein, after triggering, a return of said boom to the initial position is due solely to a weight of said end section, wherein said articulation comprises a ball joint, a guide rail, and two pins, and wherein said holding device comprises at least one jaw and wherein said at least one jaw is connected to said guide rail by another articulation, an axis of which is vertical.

4. Spray boom comprising:

an end section connected to a second section by an articulation; and a holding device intended to keep said end section in an initial position as lone as a pivoting force has not reached a certain triggering threshold, wherein, after triggering, a return of said boom to the initial position is due solely to a weight of said end section, wherein said articulation comprises a ball joint, a guide rail, and two pins, and wherein said holding device comprises at least one jaw and wherein said at least one jaw comprises a shape which complements a shape of said pins.

5. Spray boom comprising:

an end section connected to a second section by an articulation; and a holding device intended to keep said end section in an initial position as long as a pivoting force has not reached a certain triggering threshold, wherein, after triggering, a return of said boom to the initial position is due solely to a weight of said end section, wherein said articulation comprises a ball joint, a guide rail, and two pins, and wherein said holding device comprises at least one jaw and wherein said at least one jaw comprises a chamfer making it easier for said pins to return to the initial position.

6. Spray boom comprising:

an end section connected to a second section by an articulation; and a holding device intended to keep said end section in an initial position as long as a pivoting force has not reached a certain triggering threshold, wherein, after triggering, a return of said boom to the initial position is due solely to a weight of said end section, wherein said articulation comprises a ball joint, a guide rail, and two pins, and wherein said guide rail comprises a stop intended to prevent excessive pivoting of said end section about said articulation.

7. Spray boom comprising:

an end section connected to a second section by an articulation; and a holding device intended to keep said end section in an initial position as long as a pivoting force has not reached a certain triggering threshold, wherein, after triggering, a return of said boom to the initial position is due solely to a weight of said end section, wherein said holding device comprises at least one jaw, wherein said at least one jaw is held closed by a spring, and wherein said at least one jaw comprises recesses intended to accommodate said spring, allowing the triggering threshold of said holding device to be altered.

8. Agricultural sprayer which comprises at least one boom as claimed in claim 1.

* * * * *